United States Patent [19]

Hansen

[11] 4,288,114
[45] Sep. 8, 1981

[54] FITTING WITH BIASED LOCKING DEVICE FOR COUPLING PIPES

[75] Inventor: Arne H. Hansen, Doylestown, Pa.

[73] Assignee: Meyertech Incorporated, Lakewood, Colo.

[21] Appl. No.: 98,130

[22] Filed: Nov. 28, 1979

[51] Int. Cl.³ .............................................. F16L 39/00
[52] U.S. Cl. ............. ....................... 285/317; 285/39; 285/111; 285/369; 285/383
[58] Field of Search ............... 285/111, 317, 369, 383, 285/403, 404, 3, 4, 39; 137/315, 318

[56] References Cited

U.S. PATENT DOCUMENTS

| 268,686 | 12/1882 | Kaiser | 285/305 |
|---|---|---|---|
| 333,353 | 12/1885 | Smith | 285/284 |
| 755,325 | 3/1904 | Soutar | 285/317 |
| 839,947 | 1/1907 | McCluskey | 285/404 |
| 929,858 | 8/1909 | Johnson | 285/405 |
| 971,794 | 10/1910 | Scott | 29/516 |
| 1,845,426 | 1/1933 | Young et al. | 285/4 |
| 1,930,194 | 10/1933 | Dillon | 285/104 |
| 3,342,088 | 9/1967 | Smith | 137/318 |
| 3,349,792 | 10/1967 | Larkin | 137/318 |
| 3,428,075 | 2/1969 | Wagner | 137/318 |
| 3,477,750 | 11/1969 | Powell | 285/363 |
| 3,480,036 | 11/1969 | Ehrens et al. | 137/318 |
| 3,572,778 | 3/1971 | Cassel | 285/382 |
| 3,796,448 | 3/1974 | Ringkamp | 285/404 |
| 3,817,271 | 6/1974 | Rouen | 137/318 |
| 3,822,074 | 7/1974 | Welcker | 285/305 |
| 3,838,025 | 9/1974 | Kish | 285/369 |
| 4,018,246 | 4/1977 | Langstroth | 137/318 |
| 4,057,267 | 11/1977 | Jansen | 285/DIG. 21 |
| 4,067,353 | 1/1978 | Dehoff | 137/318 |
| 4,185,856 | 1/1980 | McCaskill | 285/317 |

FOREIGN PATENT DOCUMENTS

| 275602 | 6/1979 | Fed. Rep. of Germany | 285/3 |
|---|---|---|---|
| 1166752 | 10/1969 | United Kingdom | 285/3 |

Primary Examiner—Dave W. Arola
Attorney, Agent, or Firm—Fishburn, Gold and Litman

[57] ABSTRACT

A fitting for connection to a metal plain end pipe includes a generally cylindrical socket section sized to receive and cradle a pipe end portion, an annular seal in the socket section for forming a fluid-tight connection between the pipe end portion and fitting, and a locking device extensible into the socket section for securing the pipe end portion to the fitting. The socket section has a first bore extending from an exterior surface substantially through the socket wall and a coaxial, second bore of lesser diameter than the first bore extending the remainder of the way. The locking device includes a shaft having a head end and an opposite tip end for extension through the first and second bores and inwardly of the socket wall interior surface for engagement with a wall of a pipe end portion positioned in the socket section. A ring seal around the shaft engages a side wall of the first bore for providing a fluid-tight engagement between the shaft and the side wall. A coil spring sleeved on the shaft urges the tip end inwardly of the interior surface and into engagement with the pipe end portion whereby the pipe is locked to the fitting.

9 Claims, 7 Drawing Figures

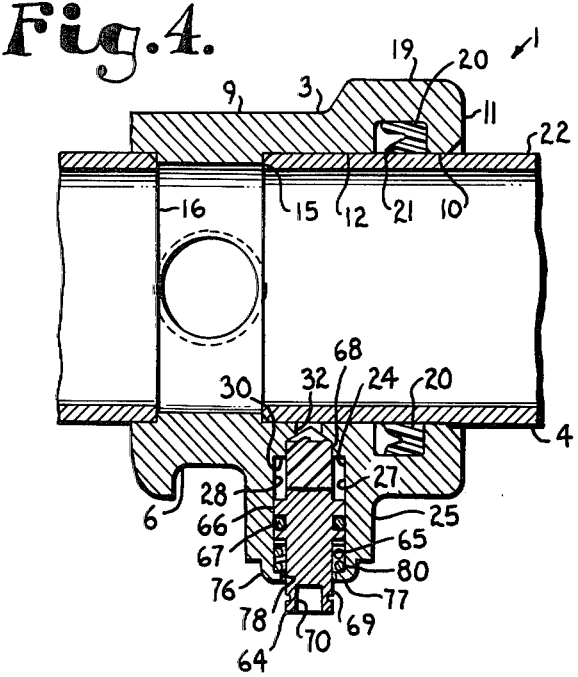
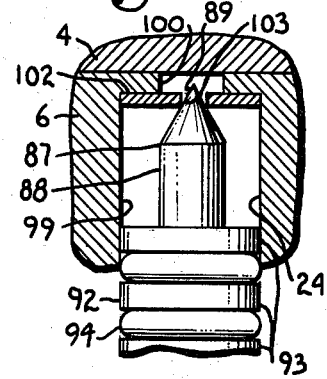
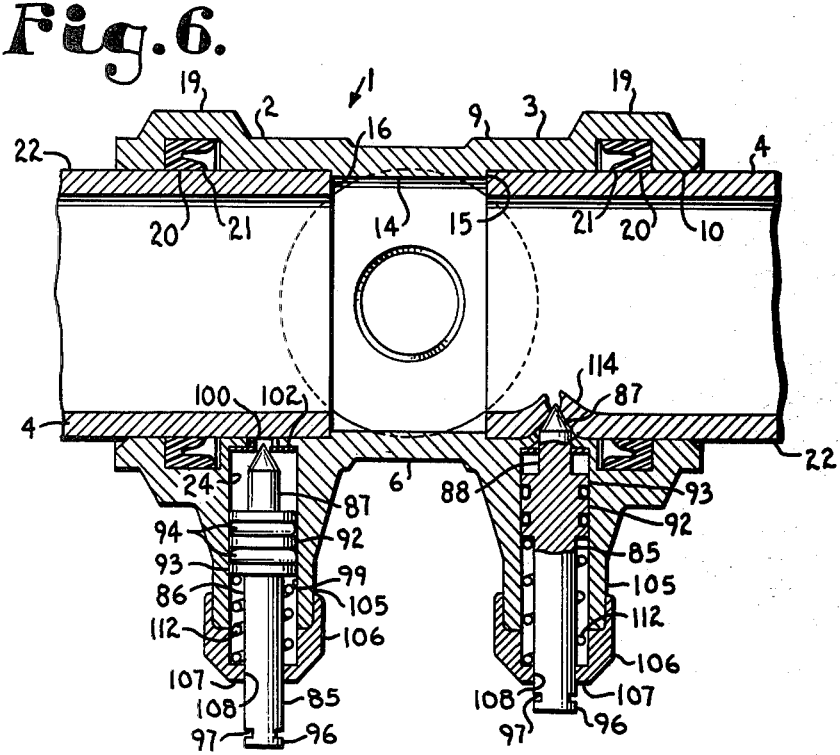

FITTING WITH BIASED LOCKING DEVICE FOR COUPLING PIPES

Pipe sections joined together to form a line or run of for flow of fluid therethrough must be free from leakage and accordingly, considerable care must be employed in selecting a fitting which will properly form joints or couples between adjacent sections of pipe and which will securely grip and maintain the pipe in a straight, leak-free relationship. Problems of pipe connection becomes particularly apparent in regard to building sprinkler systems for controlling fires, wherein joint sections of pipe must be straight and aligned with individual pipe sections prevented from twisting and longitudinally separating with respect to adjacent pipe sections and fittings spaced therealong. The problems are compounded when sprinkler heads are connected by a substantial drop length to Tee fittings, for relatively small amounts of twisting will result in a sprinkler head deviating considerably from desired orientation, leading an improper pattern of water droplet distribution.

In order to reduce cost of installation, pipe connections should be accomplished as quickly and efficiently as possible. The use of plain end pipe facilitates rapid installation twofold; first, time is not spent threading cut ends of pipe and second, the pipe ends need not be rotatably inserted into a threaded coupling. Where plain end pipe is used, the joints usually may be more readily accomplished and couples, such as Tees, quickly positioned in a desired orientation for receiving the sprinkler head drop.

The principal objects of the present invention are: to provide a fitting for plain end pipe which easily and quickly connects adjacent pipe ends in end-to-end or confronting relation along a straight line; to provide such a fitting which effectively prevents both twisting and longitudinal separation of the pipe relative to the fitting under high stress; to provide such a fitting having a seal for fluid-tight engagement with a plain end pipe and which includes an abutment member limiting intrusion of the pipe; to provide such a fitting having a locking device securing an end portion of the pipe therein; to provide such a fitting having a locking device including a shaft with a tip end for penetrating a wall of a pipe end portion inserted into the fitting; to provide such a fitting having a resilient means urging the shaft toward an extended position whereby the tip end extends inwardly of the socket section interior surface; to provide such a fitting having a ring seal around the shaft and providing a seal for a fluid-tight connection; and to provide such a fitting which is inexpensive to manufacture, simple to install, durable in use, and is particularly well adapted for its proposed use.

Other objects and advantages of this invention will become apparent from the following description taken in connection with the accompanying drawings wherein are set forth, by way of illustration and example, certain embodiments of this invention.

FIG. 4 is a fragmentary, cross-sectional view of an alternate embodiment of the fitting and locking device therefor.

FIG. 5 is an elevational view of an adaptor for a manual socket wrench engageable with a head end of an alternate embodiment of the locking device, FIG. 4.

FIG. 6 is a longitudinal, cross-sectional view of a second alternate embodiment of a plain end pipe fitting and locking devices therefor.

FIG. 7 is an enlarged, fragmentary view of a tip end and bore portions of the second alternate embodiment of the fitting and locking device, FIG. 6.

Figure 1:
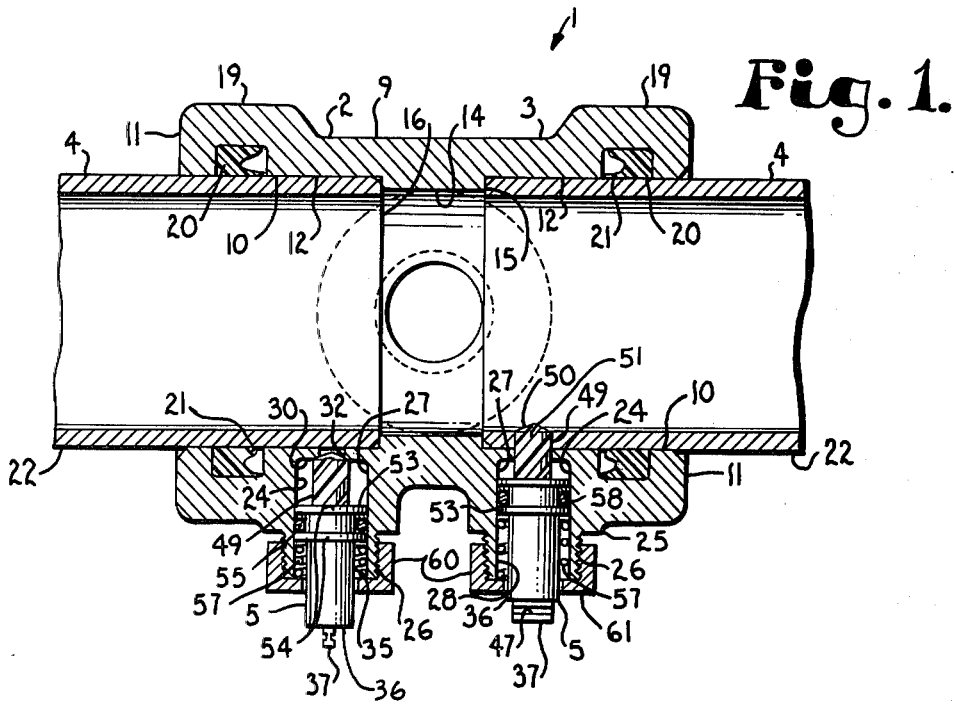
FIG. 1 is a longitudinal, cross-sectional view of a plain end pipe fitting embodying the present invention and having confronting pipe end portions secured therein.

As required, detailed embodiments of the invention are disclosed herein, however, it is understood that the embodiments are merely exemplary of the invention which may be embodied in many forms that are different from the lustrative embodiments. Therefore, specific structural and functional details disclosed herein are not to be interpreted as limiting but merely as a basis for the claims defining the scope of this invention.

In this regard, it is to be recognized that this invention may be embodied in many variations of pipe couplings or fittings such as Tees, caps, and the like, adapted for receiving an end portion of a plain end pipe and this disclosure is presented as a representative basis for teaching one skilled in the art to variously employ the present invention in virtually any appropriately detailed structure.

Referring more in detail to the drawings:

The reference numeral 1 generally designates a plain end pipe fitting or coupling embodying the present invention and having opposed sleeve or socket sections 2 and 3 sized to receive pipe plain end portions such as an end portion 4, in substantially confronting or end-to-end abuttment. The sleeve sections 2 and 3 have respective locking devices 5 extended through a wall 6 thereof for engagement with the pipe end portion 4 and preventing twisting movement and longitudinal separation of the pipe relative to the fitting 1.

The fitting 1 includes means for effecting a secure supporting grip and a leak-free seal with at least one pipe end. In the illustrated example, FIGS. 1, 2, 4 and 6, the fitting 1 is in the form of a Tee for connecting secondary lines, such as sprinkler head drops to end-to-end pipe sections, although it is within the scope of this invention to employ the inventive concept with other conduit fitting forms such as end-to-end couples, caps, angles, and the like. The fitting 1 is particularly useful in fire fighting sprinkler systems wherein a great number of relatively short lengths of pipe are utilized.

The pipe end portion 4 is plain end; that is, the end is of the same diameter as the body of the pipe and has no threads, lugs, grooves or other special connecting arrangements. Therefore, a pipe can be merely cut a desired length and the fitting 1 rapidly installed on the end thereof, thereby facilitating fast job completion and reduced labor costs compared to threaded couples and other complex connecting arrangements. The fitting 1 and the pipe to be compared to are preferably constructed of steel, cast iron or the like suitable material, the pipe normally being manufactured in industry standard diameters. The sleeve sections 2 and 3 are appropriately sized to receive the pipe end. For example, drawn steel pipe commonly used in fire sprinkler installations is manufactured in one inch and one and one half inch outside diameters and have a wall thickness of about 0.085 to about 0.145 inch. In the illustrated example, the cylindrical socket sections 2 and 3 have inside diameters sized slightly larger than the outside dimension of the pipe to easily receive and cradle the pipe end portion 4.

The exemplary socket sections 2 and 3 each have an exterior surface 9 and an interior surface 10 with outer ends 11 doubly chamfered to reduce edge chipping and promote ease of pipe end insertion. Socket sections 2 and 3 include respective inner ends 12 generally at the internal longitudinal midpoint of the fitting 1 and separated from each other by an annular ridge 14 with respectively outwardly facing annular shoulders 15 providing an abutment surface for a pipe end edge 16 to limit intrusion of the respective pipe end portion 4.

An enlarged annular housing 19 positioned intermediately of the outer end 11 and the inner end 12 in each of the socket sections 2 and 3 provides a recess accomodating respective annular seals 20 of suitable elastomeric material such as BUNA-S rubber, BUNA-N rubber, natural rubber, or well known flexible synthetics such as polyurethane, Hypalon or Viton, the latter two being DuPont Corporation (Wilmington, Del.) trademarks respectively for chloro-sulfonated polyethylene and polyvinylidiene-hexchloropropylene. The exemplary seals 20 have radially inner beads 21 for interferably engaging an outside surface 22 of the pipe end portion 4 with a compressive force and forming a fluid-tight connection between the pipe end portion 4 and the fitting 1.

The socket sections 2 and 3 each include a longitudinally advanceable locking device 5 extending through the wall 6 thereof. In the illustrated example, the socket sections 2 and 3 each include a bore 24 extending therethrough from the exterior surface 9 to the interior surface 10 and intermediately of the outer ends 11 and inner ends 12. The bore 24 is preferably directed toward the centerline or longitudinal axis of the respective socket section for substantially perpendicular engagement of the locking device with a pipe end portion 4 as described below, although it is within the concept of this invention that the locking devices 5 could advance at an angle into the socket sections 2 and 3 which does not intersect said longitudinal axis, so long as the intersection between the locking device 5 and the outside surface 22 of the pipe is not excessively oblique. The wall 6 in this example, includes an outwardly extending boss 25 surrounding the exterior opening of the bore 24 and having a threaded wall portion 26, FIG. 1.

The bore 24, in the illustrated example, has an first bore portion 27 with a smooth side wall 28 extending from the exterior surface 9 substantially through the wall 6 and having a termination 30 short of the interior surface 10. A smooth sided second bore 32 of lesser diameter than the first bore portion 27 is coaxial therewith and extends the remainder of the way through the wall 6 from the termination 30 to the interior surface 10.

Figure 3:
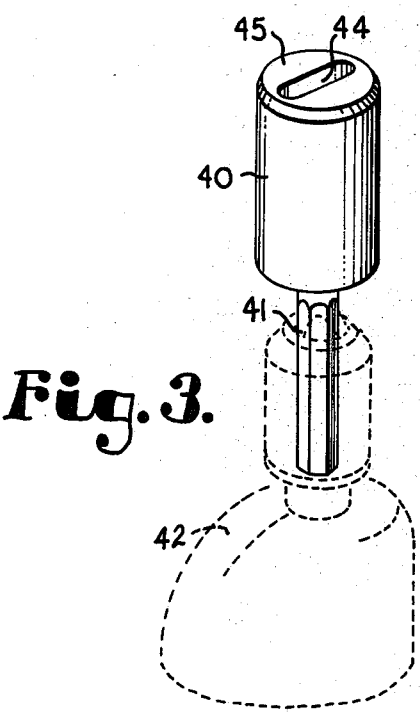
FIG. 3 is a perspective view of an adaptor for a power driven tool engageable with a head end of the locking device.

Respective locking devices 5 are engageable with each bore 24. Each locking device 5 comprises a shaft body 35 having a head end 36 having a narrow tang portion 37 adapted for engagement with a driving tool adapter 40, FIG. 3. The driving tool adapter 40 includes a shank 41 extending therefrom for engagement with the chuck of a power driven tool, such as a drill 42, and has a slot shaped aperture 44 in a forward end 45 thereof for receiving the tang portion 37 therein and effecting powered rotation. A groove 47 extends around the tang portion 37 whereby a tip of a tool, such as a screw- driver, can be inserted therein to pry the locking device 5 outwardly.

The shaft body 35 has an opposite tip end 49 for extension through the second bore portion 32 and into the pipe end portion 4. The exemplary tip end 49 has a conical end surface 50 and a plurality of flutes and cutting edges 51. A seal retaining arrangement 53 extends around the shaft body 35 generally at a mid-length portion thereof and in the illustrated example includes spaced flanges 54 sized for receipt into the first bore portion 27 and having a ring seal 55 positioned between the spaced flanges 54 for sealably contacting the smooth side wall 28 and providing a fluidtight engagement between the shaft body 35 and the side wall 28.

Means selectively retain the tip end 49 from the second bore portion 32 and in the illustrated structure the second bore portion 32 is of a lesser diameter than the tip end 49 whereby the tip end 49 remains within the bore 24 and spaced from the interior surface 10 in a ready-to-use position such as shown in connection with the socket section 2, FIG. 1. In said ready-to-use position, the margin of the tip end 49 engages the bottom of the first bore portion 27, or termination 30, immediately surrounding the second bore portion 32. The amount of the wall 6 through which the second bore portion 32 extends is preferably a relatively short distance and is removed by the cutting action of the flutes and cutting edges 51 upon longitudinal advancement and rotation of the locking device 5.

A resilient means, such as a coil spring 57, is sleeved on the shaft body 35 generally between the bottom flange 54 of the seal retaining arrangement 53 and the head end 36. A washer 58 is positioned between the coil spring 57 and the flange 54. In the preferred embodiment shown in FIGS. 1 and 2, the boss 25 is capped by a threaded nut 60 engaging the threaded wall portion 26 and with a shoulder 61 extending partially over the first bore portion 27. A central aperture 62 extends coaxially through the nut 60 and slidably receives the shaft body 35 adjacent the head end 36. The coil spring 57 is preferably of a length such that the spring 57 is compressed between the shoulder 61 and the flange 54 when in a ready-to-use position, socket section 2, FIG. 1.

Figure 2:
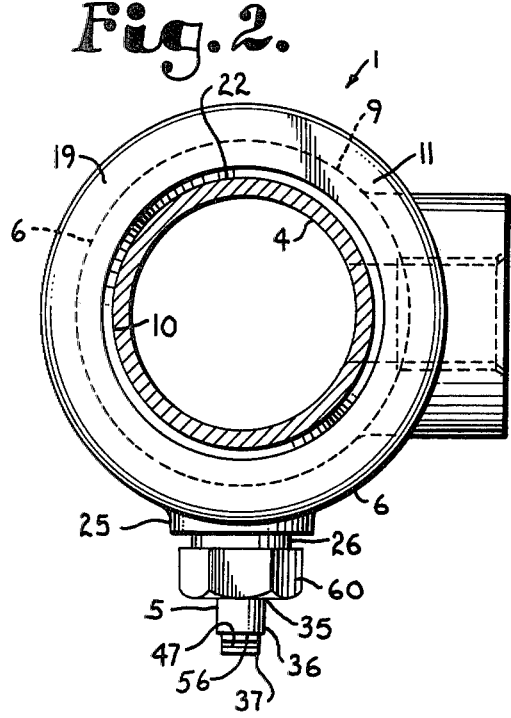
FIG. 2 is an end view of the fitting and showing a locking device thereof in a retracted or ready-to-use position.

In the use of the preferred embodiment FIGS. 1 and 2, connecting the fitting 1 with a pipe end portion 4 is extremely fast and simple and requires appropriate local cleaning and deburring of the pipe end and inserting the pipe end portion 4 into a sleeve section 2 or 3 until the end edge 16 seats against the internal annular shoulder 15. Next, the locking device 5 is rotatably advanced from a ready-to-use position, as shown in connection with socket section 2, FIG. 1, into an inwardly extending position, as shown in connection with socket section 3, FIG. 1, by engaging the tang portion 37 of the head end 36 with the driving tool adapter 40 and actuating the power tool. The flutes and cutting edges 51 drill through the fitting wall 6 surrounding the second bore portion 32 and through the side wall of the pipe end portion 4 whereby the locking device 5 engages the pipe end portion 4 with a substantial penetration of the side walls thereof to prevent longitudinal separation and twisting of the pipe relative to the fitting 1 under high stress. The fitting seals 20 and ring seal 55 remain fluidtight to guard against leakage.

As the locking device 5 rotatably advances toward the pipe end portion 4, the coil spring 57 resiliently extends and urges the shaft body 35 inwardly, thereby maintaining pressure for drill cutting on the pipe end portion without applying drilling pressure directly to the fitting 1. Further, the coil spring 57 biases the locking device 5 toward an extended position into the pipe end portion 4 and restricts loosening of the connection and separation of the pipe from the fitting 1.

In the embodiment of the fitting employing an alternately embodied locking device 64 as shown in FIG. 4, a shaft body 65 has a seal retaining arrangement 66, a ring seal 67 and a tip end 68 as described in connection with corresponding portions in the preferred embodiment, FIGS. 1 and 2. An opposite head end 69 has a recess or socket 70 therein for receipt of a drive end 72 on an extension 73 connected to, for example, a rachet action wrench 74, FIG. 5.

The alternately embodied locking device 64 extends through first and second lower portions 27 and 32 as described in connection with FIGS. 1 and 2. A boss 25 surrounds the bore 24 and has a side wall which is curved inwardly toward the shaft body 65 at an outer end 76 of the boss 25 to form an annular shoulder 77 having a central aperture 78 corresponding to the aperture 62. A coil spring 80 is sleeved on the shaft body 65 between the seal retaining arrangement 66 and the shoulder 77 and functions as described in connection with FIGS. 1 and 2 to bias the locking device 64 toward extension.

A second alternately embodied locking device 85 is shown in FIGS. 6 and 7 which includes commensurate portions having like numerals relative to the embodiments shown in FIGS. 1, 2 and 4. The locking device 85 includes an elongate shaft body 86 having a tip end 87 with a smooth side wall 88 and a conical point 89. A seal retaining arrangement 92 is positioned generally at a mid-length portion of the shaft body 86 and has a plurality of flanges 93 and spaced ring seals 94. An opposite head end 96, is preferably cylindrical for engagement with the head of a hammer or the like for driving the locking device 86 inwardly whereby the tip end 87 pierces the pipe end portion 4. Grooves 97 on the head end 96 permit grasping for outward movement and withdrawal of the locking device 85.

The secondly embodied locking device 85, FIGS. 6 and 7, is engaged within a bore 24 having a smooth wall first bore portion 99 and a smooth wall second bore portion 100 of lesser diameter than the first bore portion 99 and coaxial therewith. The second bore portion 100 is of slightly greater diameter than the tip end 87 for passage therethrough. To retain the locking device 85 in a ready-to-use position as shown in connection with socket section 2, FIG. 6, a retainer or washer 102 formed of a suitable material, such as Nylon or the like, is positioned at the juncture of the first and second bore portions 99 and 100. The retainer or washer 102 is in the form of a disc having a central opening 103 of lesser diameter than the tip end 87 whereby the tip end 87 is restrained from extension through the second bore portion 100.

A boss 105 surrounds the bore 24 and a nut 106 is threadably connected to an outer end thereof. The nut has shoulders 107 extending inwardly and partially over the first bore portion 99 and includes a central aperture 108 coaxial with the first bore 99. A coil spring 112 is sleeved on the shaft body 86 between the seal retaining arrangement 92 and the shoulders 107 and is of a length whereby the coil spring 112 is compressed when the locking device 85 is in a ready-to-use position and biases the locking device 85 toward extension.

In the employment of the second alternately embodied locking device 85, the pipe end portions 4 are inserted into the fitting 1 as described in connection with FIGS. 1 and 4 and the head end 96 is struck a single or repeated blows as necessary with a hammer or the like driving tool. The conical point 89 of the tip end 87 pierces through the washer 92 and extends through the second lower portion 100 and into contact with the side wall of the pipe end portion 4. The conical point 89 pierces through the pipe end side wall as shown in connection with the socket section 3, FIG. 6, into an inwardly extended position whereby surrounding portions 114 of the side wall of the pipe end portion 4 receive and tightly grip the tip end 87. The coil spring 112 extends when the locking device 85 is in the inwardly extended position to resist removal or inadvertent disengagement of the locking device 85 from the pipe end portion 4.

It is to be understood that while certain forms of this invention have been illustrated and described, it is not to be limited to the specific form or arrangement of parts herein described and shown, except insofar as such limitations are included in the following claims.

What is claimed and desired to secure by Letters Patent is:

1. A fitting for connection to a pipe to form a joint therewith comprising:
   (a) a generally cylindrical wall defining a pipe end receiving socket having an exterior surface and a pipe cradling interior surface;
   (b) a bore extending at least partially through said wall;
   (c) a locking device engaged in said bore and having a shaft with a head end and an opposite tip end extensible inwardly of said interior surface a sufficient distance to extend at least partially through and at least partially pierce a wall of a pipe end received in said socket for locking said pipe end in said socket;
   (d) a ring seal surrounding said shaft and forming a fluid-tight seal between said shaft and said socket; and
   (e) resilient means urging said tip end inwardly of said interior surface for maintaining engagement with said pipe end received in said socket and a retainer normally containing said tip end within said bore and spaced from said interior surface whereby said locking device is in a ready-to-use position; and wherein said resilient means urges said tip end against said retainer.

2. The fitting set forth in claim 1 wherein:
   (a) said bore has a smooth side wall; and
   (b) said shaft has a seal retaining flange extending therearound generally at a mid-length portion of said shaft and said ring seal is seated thereon and engages said smooth side wall.

3. The fitting set forth in claim 2 wherein:
   (a) a juncture between said bore and said exterior surface includes a shoulder extending inwardly and partially over said bore and including a central aperture surrounding said shaft and coaxial with said bore; and
   (b) said resilient means is a coil spring sleeved on said shaft and extending between said shoulder and said flange, said coil spring being compressed when said locking device is in said ready-to-use position.

4. The fitting set forth in claim 1 wherein:

(a) said tip end has flutes and cutting edges for drilling through said retainer and at least partially through the wall of said pipe end received in said socket.

5. The fitting set forth in claim 1 wherein:
(a) said bore includes a first bore portion extending from said exterior surface substantially through said wall and having a termination short of said interior surface;
(b) said bore includes a second bore portion of lesser diameter than said first bore portion and said tip end and coaxial therewith extending the remainder of the way through said wall from said termination to said interior surface; and
(c) said termination comprises said retainer whereby said tip end is advanceable through said wall to extend through said retainer and said second bore portion.

6. The fitting set forth in claim 1 wherein:
(a) said tip end has a smooth sidewall and a conical point thereon for piercing through said retainer and at least partially through the wall of said pipe end received in said socket.

7. The fitting set forth in claim 1 wherein:
(a) said retainer includes a disc of deformable material engaged in said bore near said interior surface and having a central opening of lesser diameter than said tip end.

8. The fitting set forth in claim 7 wherein:
(a) said bore includes a first bore portion extending from said exterior surface substantially through said wall and having a termination short of said interior surface;
(b) said bore includes a second bore portion of lesser diameter than said first bore portion and coaxial therewith extending the remainder of the way through said wall from said termination to said interior surface;
(c) said disc is positioned at said termination with said central opening coaxial with said second bore portion.

9. A pipe fitting connection comprising:
(a) a pipe having a wall and a plain end portion;
(b) a wall defining a metal pipe receiving socket having an exterior surface and a pipe cradling interior surface fitted longitudinally onto said pipe plain end portion;
(c) a first bore having a smooth side wall extended from said exterior surface substantially through said wall and having a termination short of said interior surface, the juncture between said first bore and said exterior surface having a shoulder extending partially over said first bore and including a central aperture coaxial with said first bore;
(d) a second bore of lesser diameter than said first bore and coaxial therewith extending the remainder of the way through said side wall from said termination to said interior surface;
(e) a locking device having a shaft for extension through said first and second bores and including a head end generally adjacent said exterior surface and an opposite tip end for extension inwardly of said interior surface and piercing through the wall of said pipe end portion positioned in said socket and a seal retaining flange extending around said shaft generally at a midlength portion thereof, said seal retaining flange having a ring seal thereon engaging said side wall of said first bore and providing a fluid-tight engagement between said shaft and said side wall;
(f) a retainer normally maintaining said locking device in a ready-to-use position whereby said tip end is spaced from said interior surface;
(g) a coil spring sleeved on said shaft between said flange and said shoulder, said spring being compressed when said locking device is in said ready-to-use position and urging said tip end against said retainer and whereby, when said tip end is engaged with the wall of said pipe end portion positioned in said socket, said spring biases said locking device toward an extended position locking said pipe end portion to said socket.

* * * * *